United States Patent [19]
Fendt

[11] 3,755,711
[45] Aug. 28, 1973

[54] ASYMMETRY PROTECTION ARRANGEMENT FOR SERIES-CONNECTED CAPACITOR UNITS

[75] Inventor: Alfons Fendt, Erlangen, Germany

[73] Assignee: Siemens Aktiengesellschaft, Munich, Germany

[22] Filed: Dec. 18, 1972

[21] Appl. No.: 315,866

[30] Foreign Application Priority Data
Dec. 18, 1971 Germany................... P 21 63 004.6

[52] U.S. Cl............ 317/12 B, 317/27 R, 317/40 A, 324/51
[51] Int. Cl. ............................................ H02h 7/06
[58] Field of Search.............. 317/12 R, 12 A, 12 B, 317/27 R, 40 A; 324/51, 133

[56] References Cited
UNITED STATES PATENTS
3,248,607  4/1966  Lemens............................ 317/12 R
3,486,073  12/1969  Eriksson et al. ................... 317/12 R
3,517,263  6/1970  Okamura et al. .................. 317/12 R Primary Examiner—James D. Trammell
Attorney—Hugh A. Chapin and Richard L. Mayer

[57] ABSTRACT

Capacitors operable at high voltages consist of series-connected capacitor units, each of which is in turn composed of capacitors which are connected parallel to each other and can be individually disconnected by fuses. An asymmetry protection arrangement is disclosed for monitoring these units for voltage asymmetries. The arrangement compares the sum of the voltage drops present at the individual capacitor units with the voltage drop of the individual capacitor units to provide a signal in response to a fault condition. The signal thus obtained is usable for initiating a turn-off operation or for indicating a fault condition.

8 Claims, 2 Drawing Figures

ASYMMETRY PROTECTION ARRANGEMENT FOR SERIES-CONNECTED CAPACITOR UNITS

BACKGROUND OF THE INVENTION

Capacitors for high voltages are used particularly for smoothing harmonic voltages in direct-current systems or for making available reactive power in single- or three-phase alternating-current systems. In practice, such capacitors consist of many individual capacitor elements which are mutually connected in shunt and in series.

All parallel-connected capacitor elements can be designated as being a capacitor unit and this capacitor unit then consists of several parallel branches with one capacitor element each and a fuse connected in series therewith. This fuse prevents a short circuit of one capacitor element from causing a permanent short circuit of the entire capacitor unit. If therefore a short circuit occurs in such a capacitor element, this capacitor element is separated by the fuse connected in series therewith, while the other capacitor elements of the capacitor unit remain operative. However, the overall capacitor area of the capacitor unit is decreased thereby so that the capacity of the capacitor unit is reduced and, for constant current flowing through the series-connected capacitor units, the voltage drop at the capacitor unit affected becomes greater. Although the capacitors for high voltage are constructed so that even in the event of failure of several capacitor elements, the capacitor still has sufficient capacity and can stand the voltage applied, it is important to report the failure or even the first disconnected capacitor element because this condition leads to increased voltage and thereby to increased stress of the undamaged elements of the capacitor unit in question.

SUMMARY OF THE INVENTION

It is an object of the invention to provide an asymmetrical protective arrangement for series-connected capacitor units which provides an indication of failure of one or up to several capacitor elements.

The asymmetry protection arrangement of the invention is provided for a plurality of serially connected capacitor units which are connectable across a voltage difference, this results in a voltage drop across each of the units. The capacitor units each contain a plurality of fused capacitors connected in parallel with each other.

A feature of the arrangement of the invention is a summation circuit for forming an electrical sum quantity proportional to the sum of the voltage drops across the capacitor units. A plurality of monitoring circuits corresponding to respective ones of the capacitor units provides respective monitored quantities proportional to the voltage drops across the capacitor units. Also provided as part of the protection arrangement is a plurality of comparison circuits corresponding to respective ones of the capacitor units. Each of the comparison circuits has a first input connected to the summation circuit for receiving the sum quantity and has a second input connected to a corresponding one of the monitoring circuits to receive the monitored quantity thereof. Each of the comparison circuits compares the sum quantity to the monitored quantity indicative of the voltage drop across the corresponding capacitor unit to provide an output in response to a failure of at least one of the fused capacitors in the corresponding capacitor unit.

According to another feature of the invention, each of the monitoring circuits can include a voltage transformer having a primary winding connected in parallel with the corresponding capacitor unit and having a secondary winding. The respective secondary windings of the voltage transformers corresponding to the capacitor units are star-connected, and a plurality of auxiliary transformers are provided having respective primary windings serially connected with corresponding ones of the last-mentioned secondary windings.

Each of the auxiliary transformers can have at least two secondary windings. The summation circuit then includes one secondary winding of the secondary windings of each of the auxiliary transformers, these one secondary windings being connected in a polygonal circuit. The other secondary winding of the two secondary windings of each of the auxiliary transformers provide the monitored output proportional to the voltage drop across the corresponding capacitor unit.

Each of the comparison circuits can include two rectifying circuits connected antiparallel with each other, the rectifying circuits having respective sets of ac terminals for receiving the monitored quantity of the corresponding monitoring circuit and the sum quantity of the summation circuit. The rectifying circuits have respective sets of dc terminals and a measuring instrument connected with each of the sets of dc terminals for responding to a failure of at least one of the fused capacitors.

According to another feature of the invention, the protection arrangement can be provided with a second plurality of monitoring circuits likewise corresponding to respective ones of the capacitor units for providing respective second monitored quantities proportional to the voltage drops across the capacitor units. A second summation circuit then forms a second electrical sum quantity proportional to the sum of the voltage drops across the capacitor units. The first-mentioned summation circuit and the second summation circuit have respective proportionality factors selected so that for the same voltage drop on all capacitor units one of the sum quantities is the same amount over and the other one of the sum quantities is the same amount below the value of the monitored quantities of the monitoring circuits. The comparison circuits each have first and second input pairs. Each of the first-mentioned monitoring circuits is serially connected in difference fashion with the first-mentioned summation circuit to form a first plurality of difference circuits corresponding to the capacitor units respectively and each of these difference circuits is connected across the first input pair of a corresponding one of the comparison circuits. Each monitoring circuit of the second plurality of monitoring circuits is serially connected in difference fashion with the second summation circuit to form a second plurality of difference circuits corresponding to the capacitor units respectively and each of these last-mentioned difference circuits is connected across the second input pair of a corresponding one of the comparison circuits.

Although the invention is illustrated and described herein as an asymmetry protection arrangement for series-connected capacitor units, it is nevertheless not intended to be limited to the details shown, since various modifications may be made therein within the scope and the range of the claims. The invention, how-

DESCRIPTION OF THE PREFERRED EMBODIMENTS OF THE INVENTION

Figure 1:
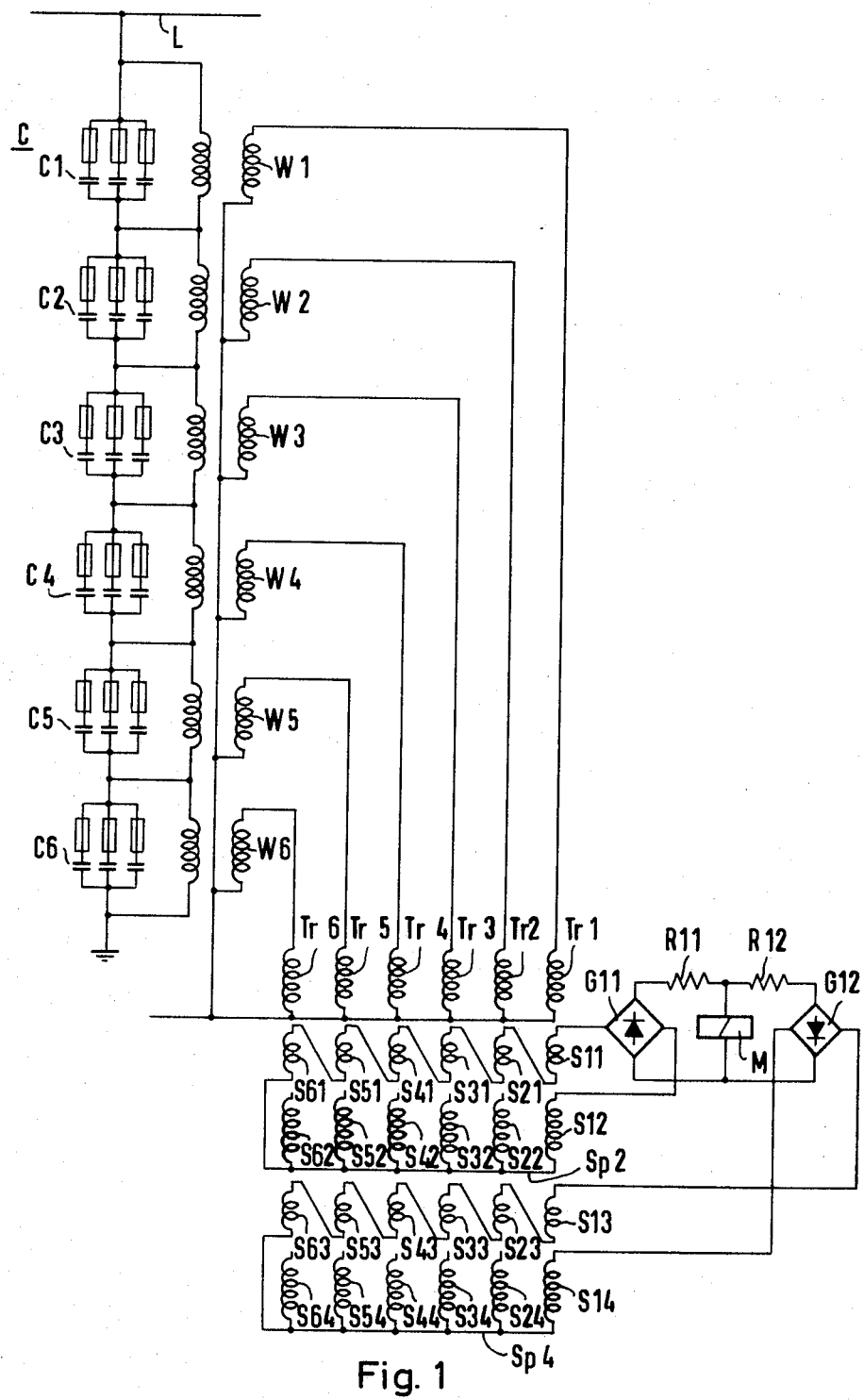
FIG. 1 is an electric schematic diagram of an asymmetrical protection arrangement according to the invention.

Referring to FIG. 1, the capacitor C consists of individual capacitor units C1 to C6. Each of these capacitor units consists of several parallel-connected capacitor elements. Each of the capacitor elements is connected in series with a fuse. The primary winding of a voltage transformer (W1 to W6) is connected in shunt with each capacitor unit (C1 to C6). The primary windings of the voltage transformers W1 to W6 are connected in series with each other like the corresponding capacitor units and therefore serve as discharge resistors for the individual capacitor units after the capacitor C is disconnected from the line L. Additional discharging resistors therefore need not be provided.

The secondary windings of the voltage transformers W1 to W6 are star-connected. The star point is connected with the star point of a corresponding number of auxiliary transformers Tr1 to Tr6. The remaining leads of the windings of the auxiliary transformers Tr1 to Tr6 are connected to the free leads of the secondary windings of the voltage transformers W1 to W6. Each auxiliary transformer Tr1 to Tr6 has four secondary windings. The secondary windings of the transformer Tr1 are designated with S11, S12, S13 and S14. Similarly, the secondary windings of the remaining auxiliary transformers Tr2 to Tr6 are designated with S21 to S64. The secondary windings S11, S21 . . . to S61 are connected in series with one another. The series circuit is connected on the one hand to an ac input of a rectifier bridge circuit G11 and on the other hand, to the star point Sp2 of the secondary windings S12, S22, S32, . . . to S62. The free lead of the secondary winding S12 is connected to the other ac input of the rectifier bridge G11. Not shown in detail in the drawing, there exists for each of the other secondary windings S22 to S62 a rectifier circuit corresponding to the rectifier circuit G11, one ac terminal of which is connected to the same terminal as the ac terminal of the rectifier bridge circuit G11, while the second ac terminal is connected to the corresponding secondary winding S22 to S62. The other rectifier circuits, which are parts of the respective comparator arrangements, are not shown in the drawing, as their circuit is identical with that for the capacitor unit C1. A second rectifier circuit G12 is connected with its ac leads in a manner similar to the rectifier circuit G11: on the one hand to secondary windings S13 and S63 which are connected in series with each other, and on the other hand with the secondary winding S14. The secondary winding S14 is connected, like the secondary winding S12, together with the other, similar secondary windings of the other auxiliary transformers, to a star point Sp4, which is connected to the second terminal of the series circuit consisting of the secondary windings S13 to S63. The direct-current terminals of the rectifier circuits G11 and G12, which are connected antiparallel to each other, are connected with each other via resistors R11, R12, and there is further a diagonal branch with a measuring instrument M, which responds to direct-current in a sense dependent upon the sign.

The operation of this circuit will now be described. If the nominal voltage is present, and with the current flowing under this condition through the capacitor C, the secondary windings S11, S21 to S61 are constructed so that a voltage drop of 4 V occurs at each of them. The voltage at the secondary windings S12, S22 to S62, however, is 48 V each. From the sense of the interconnection, the difference voltage $6 \times 4 - 48 = -24$ V appears at the ac terminals of the rectifier circuit G11. The secondary windings S13, S23 to S63 are constructed so that for nominal voltage at the capacitor C and with symmetrical voltage division over the capacitor units C1 to C6 a voltage drop of 12 V prevails at each of them. The secondary windings S14, S24 to S64 have the same number of turns as the secondary windings S12 to S62. Consequently, with the same assumed sign for the voltage, a voltage of $6 \times 12 - 48 = +24$ V appears at the ac terminals of the rectifier G12. In the rectifier circuits G11 and G12 the absolute values of the voltages appearing at the ac terminals are now formed. These are equal to each other, so that no current flows through the measuring instrument M.

Suppose now a fault occurs, for example a fault in the capacitor unit C1, and as a consequence the voltage at this capacitor unit, and therefore at the secondary windings of the auxiliary transformer Tr1, is now increased, the voltage at the rectifier circuit G11 will fall below $-24$ V because the voltage at the secondary winding S12 is larger than that of the secondary winding S11; at the dc terminals of the rectifier circuit G11 a higher voltage therefore appears.

Also at the secondary winding S14 there appears a higher voltage than at the secondary winding S13 connected in series thereto, so that here, too, the voltage value at the secondary winding S14 predominates when the difference due to the series connection of the secondary windings S13 to S63 and the secondary winding S14 is formed. The voltage of $+24$ V appearing at the rectifier arrangement G12 therefore likewise becomes less. This causes the absolute value of the voltage appearing at the ac terminals of the rectifier arrangement G12 to drop; this voltage is proportional to the voltage between the dc terminals of the rectifier circuit G12. An increase of the absolute value of the voltage at the dc terminals of the rectifier circuit G11 is therefore balanced by a decrease of the voltage at the dc terminals of the rectifier circuit G12.

Calculating the magnitude of this voltage change, referred to the voltage normally appearing at the dc terminals of the rectifier circuits G11 and G12, shows that with this circuit a relatively large part of the current flows through the measuring instrument M for small changes of a voltage as compared to the average of the other voltages. The measuring instrument can be constructed so that either it delivers a signal for a definite deviation of the voltage at the corresponding capacitor unit C1, but it may also contain several relays or threshold devices which respond to deviations of different magnitude, so that, depending on the magnitude of the voltage deviation from the average of the others, one or several alarms in stages can be transmitted.

Figure 2:
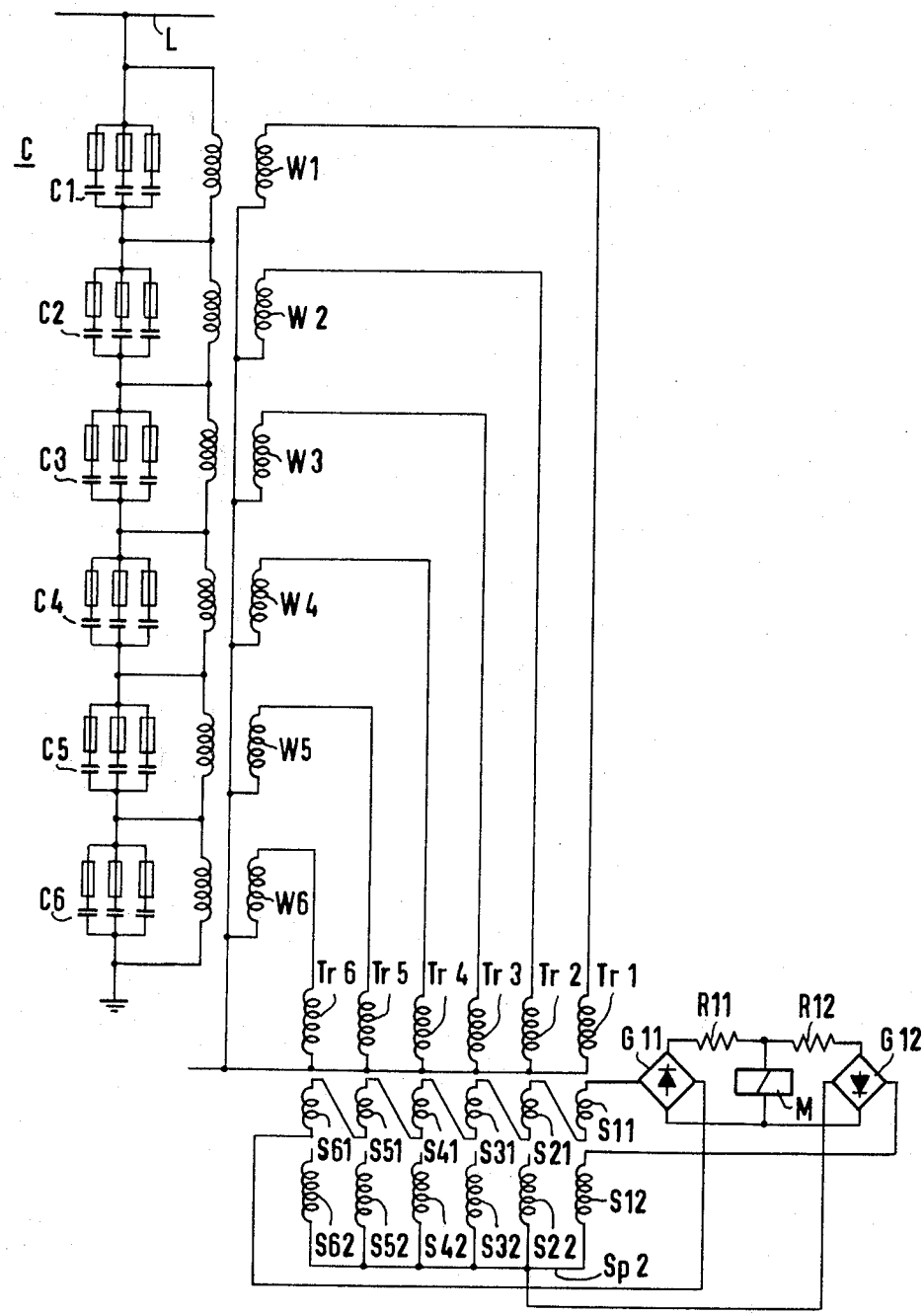
FIG. 2 is an alternative embodiment of the asymmetrical protection arrangement wherein the circuit configuration is somewhat simpler and the sensitivity of the comparison circuits is somewhat less than in the embodiment according to FIG. 1.

However, it is possible to provide only two windings for each auxiliary transformer Tr1 to Tr6 as illustrated in FIG. 2. The series-connected windings are then connected to a rectifier circuit, and the voltage at the second secondary winding S12 to S62 is fed to the ac terminals of the respective second rectifier circuit. Also in this case, provision must be made that the voltages at the two rectifier circuits are equal to each other in the undisturbed operation of the capacitor C. In this somewhat simpler circuit, the sensitivity of the measuring bridge is smaller, but this can be compensated for within certain lmits by the choice of correspondingly sensitive measuring instruments M. However, the particular advantage of a circuit with four secondary windings for each auxiliary transformer is that considerably greater sensitivity can be achieved with less drain.

What is claimed is:

1. An asymmetry protection arrangement for a plurality of serially connected capacitor units connectable across a voltage difference resulting in a voltage drop across each of the units, each of the units containing a plurality of fused capacitors connected in parallel with each other, the arrangement comprising a summation circuit for forming an electrical sum quantity proportional to the sum of the voltage drops across the capacitor units, a plurality of monitoring circuits corresponding to respective ones of the capacitor units for providing respective monitored quantities proportional to the voltage drops across the capacitor units, and a plurality of comparison circuits corresponding to respective ones of the capacitor units, each of said comparison circuits having a first input connected to said summation circuit for receiving said sum quantity and having a second input connected to a corresponding one of said monitoring circuits to receive the monitored quantity thereof, each of said comparison circuits comparing said sum quantity to the monitored quantity indicative of the voltage drop across the corresponding capacitor unit to provide an output in response to a failure of at least one of the fused capacitors in the corresponding capacitor unit.

2. The asymmetry protection arrangement of claim 1, each of said monitoring circuits comprising a voltage transformer having a primary winding connected in parallel with the corresponding capacitor unit and having a secondary winding, the respective secondary windings of the voltage transformers corresponding to the capacitor units being star-connected; and a plurality of auxiliary transformers having respective primary windings serially connected with corresponding ones of said secondary windings.

3. The asymmetry protection arrangement of claim 2, each of said auxiliary transformers having at least two secondary windings; said summation circuit comprising one secondary winding of the secondary windings of each of said auxiliary transformers, the one secondary windings being connected in a polygonal circuit; and the other secondary winding of the secondary windings of each of said auxiliary transformers providing the monitored output proportional to the voltage drop across the corresponding capacitor unit.

4. The asymmetry protection arrangement of claim 1 each of said comparison circuits comprising two rectifying circuits connected antiparallel with each other, said rectifying circuits having respective sets of ac terminals for receiving the monitored quantity of the corresponding monitoring circuit and said sum quantity of said summation circuit, each of said rectifying circuits having respective sets of dc terminals, and a measuring instrument connected with each of said sets of dc terminals for responding to a failure of at least one of the fused capacitors.

5. The asymmetry protection arrangement of claim 1 comprising a second plurality of said monitoring circuits likewise corresponding to respective ones of the capacitor units for providing respective second monitored quantities proportional to the voltage drops across the capacitor units, a second summation circuit for forming a second electrical sum quantity proportional to the sum of the voltage drops across the capacitor units, said first-mentioned summation circuit and said second summation circuit having respective proportionality factors selected so that for the same voltage drop on all capacitor units one of said sum quantities is the same amount over and the other one of said sum quantities is the same amount below the value of said monitored quantities of said monitoring circuits, each of said comparison circuits having first and second input pairs, each of said first-mentioned monitoring circuits being serially connected in difference fashion with said first-mentioned summation circuit to form a first plurality of difference circuits corresponding to the capacitor units respectively, each of said difference circuits being connected across said first input pair of a corresponding one of said comparison circuits, each monitoring circuit of said second plurality of monitoring circuits being serially connected in difference fashion with said second summation circuit to form a second plurality of difference circuits corresponding to the capacitor units respectively, each of said last-mentioned difference circuits being connected across the second input pair of a corresponding one of said comparison circuits.

6. The asymmetry protection arrangement of claim 5, each of said monitoring circuits comprising a voltage transformer having a primary winding connected in parallel with the corresponding capacitor unit and having a secondary winding, the respective secondary windings of the voltage transformers corresponding to the capacitor units being star-connected; and a plurality of auxiliary transformers having respective primary windings serially connected with corresponding ones of said secondary windings, each of said auxiliary transformers having four secondary windings, two of the secondary windings of the four secondary windings of each of said auxiliary transformers having the same number of turns for providing the monitored outputs proportional to the voltage drop across the corresponding capacitor unit, the first winding of the remaining two secondary windings of each of said auxiliary transformers having a first number of turns and the second winding of said remaining two secondary windings having a second number of turns different from said first number of turns, the first windings being connected in an open polygonal circuit to form the first-mentioned summation circuit and the second windings being likewise connected in an open polygonal circuit to form said second summation circuit.

7. The asymmetry protection arrangement of claim 6, said polygonal circuit made up of said first windings being a serial connection of said first windings, each of said difference circuits of said first plurality of difference circuits being made up of a serial connection of one of said first-mentioned two secondary windings corresponding to the capacitor unit and said last-mentioned polygonal circuit, said polygonal circuit made up of said second windings being a serial connection of said second windings, each of said difference circuits of said second plurality of difference circuits being made up of a serial connection of the other one of said first-mentioned two secondary windings corresponding to the capacitor unit and said last-mentioned polygonal circuit.

8. The asymmetry protection of claim 5 each of said comparison circuits comprising two rectifying circuits connected antiparallel with each other, said rectifying circuits having respective sets of ac terminals, one of said sets receiving the monitored quantity of the corresponding first-mentioned monitoring circuit and said sum quantity of said first-mentioned summation circuit and the other one said sets receiving the monitored quantity of the corresponding second monitoring circuit and said sum quantity of said second summation circuit, said rectifying circuits having respective sets of dc terminals, and a measuring instrument connected with each of said sets of dc terminals for responding to a failure of at least one of the fused capacitors.

* * * * *

UNITED STATES PATENT OFFICE
CERTIFICATE OF CORRECTION

Patent No. 3,755,711　　　　　Dated August 28, 1973

Inventor(s) Alfons Fendt

It is certified that error appears in the above-identified patent and that said Letters Patent are hereby corrected as shown below:

Column 1, line 32 "failure or" should read --failure of--,

Column 3, line 63 "and S 63" should read --to S 63--, and

Column 7, line 13 "circuIts" should read --circuits--

Signed and sealed this 25th day of December 1973.

(SEAL)
Attest:

EDWARD M. FLETCHER, JR.　　　　　RENE D. TEGTMEYER
Attesting Officer　　　　　　　　Acting Commissioner of Patents